Dec. 4, 1951     C. G. HASKELL     2,577,325
WAVE AND TIDE POWER PLANT Filed Sept. 22, 1947     7 Sheets—Sheet 2

INVENTOR
Chester G. Haskell
BY

Dec. 4, 1951     C. G. HASKELL     2,577,325
WAVE AND TIDE POWER PLANT
Filed Sept. 22, 1947     7 Sheets-Sheet 3

INVENTOR
Chester G. Haskell

Dec. 4, 1951  C. G. HASKELL  2,577,325
WAVE AND TIDE POWER PLANT
Filed Sept. 22, 1947  7 Sheets-Sheet 4

INVENTOR
Chester G. Haskell

Dec. 4, 1951    C. G. HASKELL    2,577,325
WAVE AND TIDE POWER PLANT
Filed Sept. 22, 1947    7 Sheets-Sheet 5

INVENTOR
Chester G. Haskell
BY

INVENTOR
Chester G. Haskell

Dec. 4, 1951        C. G. HASKELL        2,577,325
WAVE AND TIDE POWER PLANT
Filed Sept. 22, 1947        7 Sheets-Sheet 7

INVENTOR
Chester G. Haskell

Patented Dec. 4, 1951

2,577,325

UNITED STATES PATENT OFFICE 2,577,325

WAVE AND TIDE POWER PLANT

Chester G. Haskell, Los Angeles, Calif., assignor, by decree of distribution, to Earl H. Haskell and Betty Sue Haskell Application September 22, 1947, Serial No. 775,538

9 Claims. (Cl. 61—20)

This invention relates to a wave power plant and it is an object of the invention to provide a plant of this kind to be constructed along a sea or other shore where there are waves and tides and which includes a reservoir or basin which is adequately supplied with fluid by the waves and tides, singly or collectively.

It is also an object of the invention to provide a plant of this kind including a sea wall or bulk head constructed in the sea, or other body of water having waves and tides, near the shore and which bulk head or sea wall is preferably constructed at the point outwardly from the ebb tide shore line at which the ordinarily expected medium waves reach the shelving sea bottom; in other words, at the point where said waves break at low tide and make white caps.

An additional object of the invention is to provide a power plant of this kind comprising a turbine or water wheel which is operated from a stand of water to be contained within a reservoir of predetermined dimensions and which reservoir is positioned along a shore so that the supply of water within the reservoir can be maintained as a result of the pushing effect of the waves and the rising of the tide.

The invention also has for an object to provide a plant of this kind including a main reservoir in which is contained the supply of fluid for operating the turbine and/or water wheel, together with a discharge receiving reservoir into which the main reservoir empties after operating the turbine or water wheel, together with a discharge receiving reservoir into which the main reservoir empties after operating the turbine or water wheel, said discharge reservoir being so constructed and positioned as to provide a discharge receptacle lower than the head of water in the main reservoir regardless of the state of the waves and tides that supply the main reservoir with fluid.

The invention also has for an object to provide a plant of this kind including a main reservoir in which is contained the supply of fluid for operating a turbine or water wheel, together with a discharge reservoir into which the main reservoir empties after operating the turbine or water wheel, said discharge reservoir being provided with means to permit the egress of its fluid into the sea when tidal conditions permit yet denying the ingress of the sea into said discharge reservoir when tidal conditions are unfavorable.

A still further object of the invention is to provide a power plant of this kind embodying a main reservoir including a bulk head or seawall constructed in a manner whereby at points therealong are confining areas which operate to localize the force of the water rolling therein to assure the passage of the water over the seawall into the reservoir in substantially a continuous flow.

A still further object of the invention is to provide a power plant of this kind embodying a main reservoir including a bulk head or seawall constructed in a manner whereby at points therealong are located gates permitting the ingress of the fluid into said reservoir but denying the egress of said fluid back into the sea.

The invention consists in the details of construction and in the combination and arrangement of the several parts of my improved power plant whereby certain advantages are attained, as will hereinafter be more fully set forth.

In order that my invention may be better understood, I will now proceed to describe the same with reference to the accompanying drawings, wherein:

Figure 10 is an enlarged view in top plan and of a diagrammatic character taken within the area defined by the broken lines 10 of Figure 1;

In the embodiment of the invention as illustrated in the accompanying drawings, W denotes a seawall, dike, or levee of desired dimensions and which is preferably made of a cementitious material, although of course, the invention is not to be so limited. This wall, dike, or levee W is preferably positioned on the seashore at the depth where the bottoms of the ordinarily expected medium sized waves reach the shelving sea bottom at low tide. Research has shown that the depth is generally between six and eight feet at said point. It is of advantage to locate the wall dike, or levee W across some natural nooks or indentures in the coastline which will more economically give a large storage area to assure an adequate head of water to be used during times of calm and/or unusual wave and tidal conditions.

It is also to be stated that should it be desired to construct this plant where the depth of the water or the force of the waves will interfere with the construction, the wall, dike, or levee W can be built back in the more shallow water and then the ocean bed in front of the wall dredged out to the required depth.

Figures 1, 2:
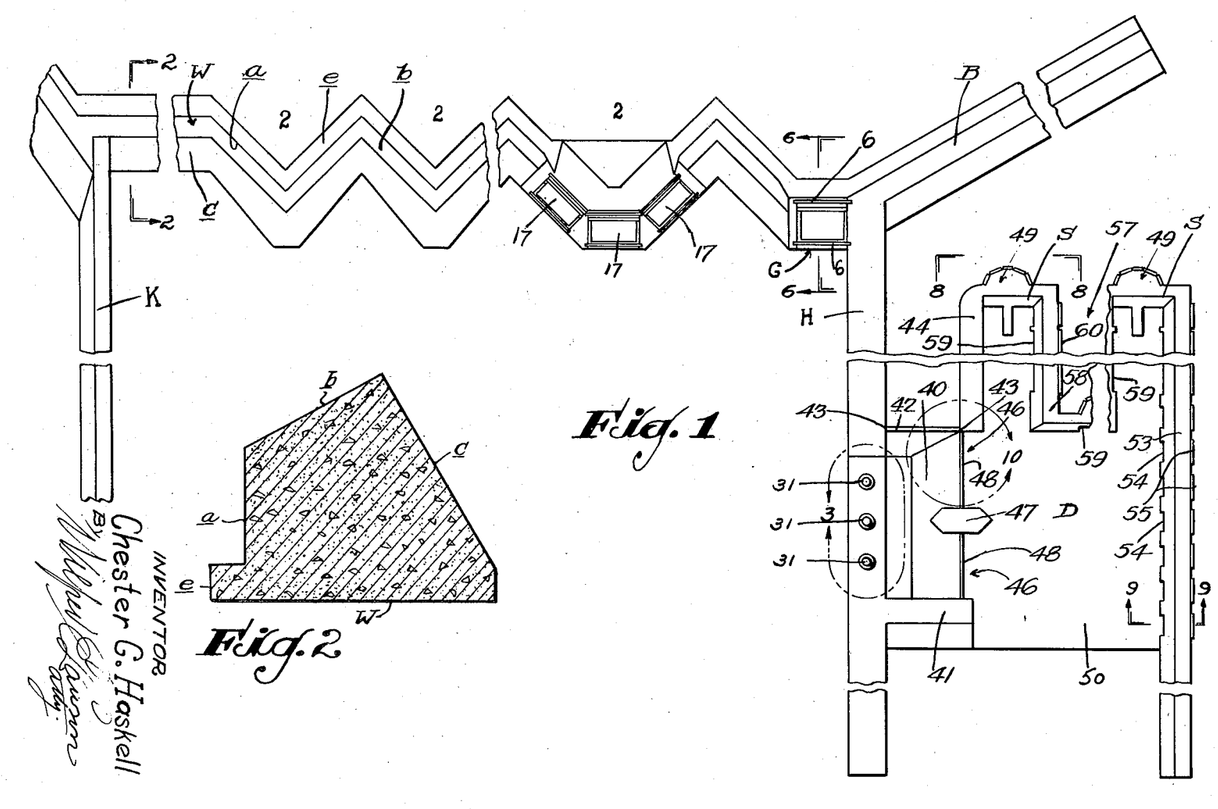
Figure 1 is a diagrammatic view in top plan of a power plant constructed in accordance with an embodiment of the invention.
Figure 2 is an enlarged detailed sectional view taken substantially along the line 2—2 of Figure 1.

The wall, dike, or levee W is, of course, to be of such dimensions as the requirements of practice may necessitate and as particularly illustrated in Figure 2, this wall, dike, or levee W is provided with a verticle flat face $a$ of desired height and which is continued at its upper margin by upwardly inclined portions $b$ of such an angle as to permit the fluid to readily roll over the surface of $b$ into the reservoir R which constitutes the main water supply.

The rear face $c$ of this wall, dike, or levee W is disposed downwardly on a predetermined incline although this is of no particular import.

The lower marginal portion of the wall, dike, or levee W at the front thereof is provided with a forwardly directed projection $e$ which provides a reinforcing or bracing medium to facilitate the wall, dike, or levee W withstanding the pressure of the water within the reservoir R. This reinforcement $e$ also serves as an effective medium to prevent the sea water from undermining the base of the wall W. It is believed to be readily apparent in practice that the force and power of the waves is directed against the vertical face $a$ of the wall W and that the upper portion of the wave will readily rise over the inclined surface $b$ into the reservoir.

The wall W is constructed substantially in a zigzag formation except where the water is deep and the waves are generally high, in order to create receiving areas 2 within the sea facing portion of the wall W. The receiving areas 2 are substantially V-shaped in form with apices thereof inwardly disposed. The size of each of these areas 2 is, of course, to be determined by the requirements of practice and is only diagrammatically indicated on the accompanying drawings. Each of these areas 2 serves to concentrate or confine the water as it flows within the area due to the rising of the tide and the waves so that the kinetic energy of the water will be focalized within said areas 2 thereby raising the level of the sea therein and assuring that there will be a substantially continuous flow of water over the portion $b$ of the wall W into the reservoir. This is further assured in view of the fact that there can normally be expected a plurality of waves within each of the areas 2.

Figure 6:
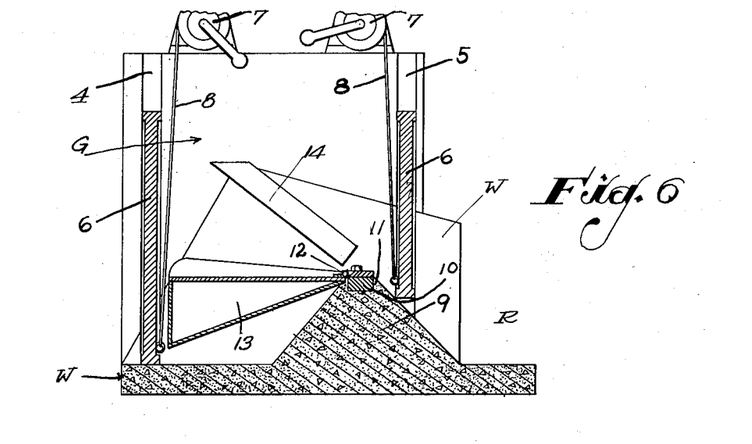
Figure 6 is an enlarged fragmentary sectional view taken substantially on the line 6—6 of Figure 1.

Provision is made at suitable intervals along the wall W for fluid entrances G best shown in Figure 6. These entrances G are used as the requirements of practice may necessitate but are expected to be useful where the waves are small and especially during intervals of extreme calm when little more than the ebb and flow of the tide will contribute fluid to the reservoir R. As illustrated in the accompanying drawings, the entrances G constitute rectangular openings in the wall W, said openings extend vertically from the top of the forwardly directed projection $e$ as in Figure 2, to a desired height above the capacity fluid level of the reservoir R. Vertical angular guides 4 and 5 formed opposite to each other in the boundary walls of the rectangular openings in the wall W. One of the opposed pair of vertical guides 4 near the outer edge of the wall W and another opposed pair of vertical guides 5 near the inner edge of the wall W. Vertically sliding gates 6 are held in position by said guides 4 and 5. Each of said gates 6 is provided with a conventional winch 7 and cable 8 for optional and independent raising and lowering. In Figure 6, said vertically sliding gates are shown in a closed position while in Figure 7 said gates are shown in a fully raised or fully open position.

The bottom or floor of each of the entrances or openings G at the induction end is provided thereacross with an upstanding supplemental wall 9 of a height materially less than that of the wall W proper. As hereinafter described, this supplemental wall 9 is substantially V-shaped in cross section with its apex 11 upwardly disposed.

Rigid within the wall 9 and herein disclosed as embedded in the apex portion 11 of the wall, is a cross member 10 of desired material and to which is hingedly connected as at 12, a marginal portion of a float valve 13.

This float valve 13, as herein described, is triangular in cross section but of such longitudinal size as to fit snugly between the boundaries of the entrance or opening G with such tolerance as to permit said float 13 to move freely yet to deny passage of fluid between the opposed longitudinal edges of said float 13 and the openings of the wall W.

Suitable angular stops 14 are firmly affixed to opposite sides of the rectangular opening of the wall W at a desired height, and the inner faces of said stops 14 at their lower portions are rabbeted, as at 15, to snugly receive the upstanding tabs 16 at the sides of the float 13.

Figures 7, 11:
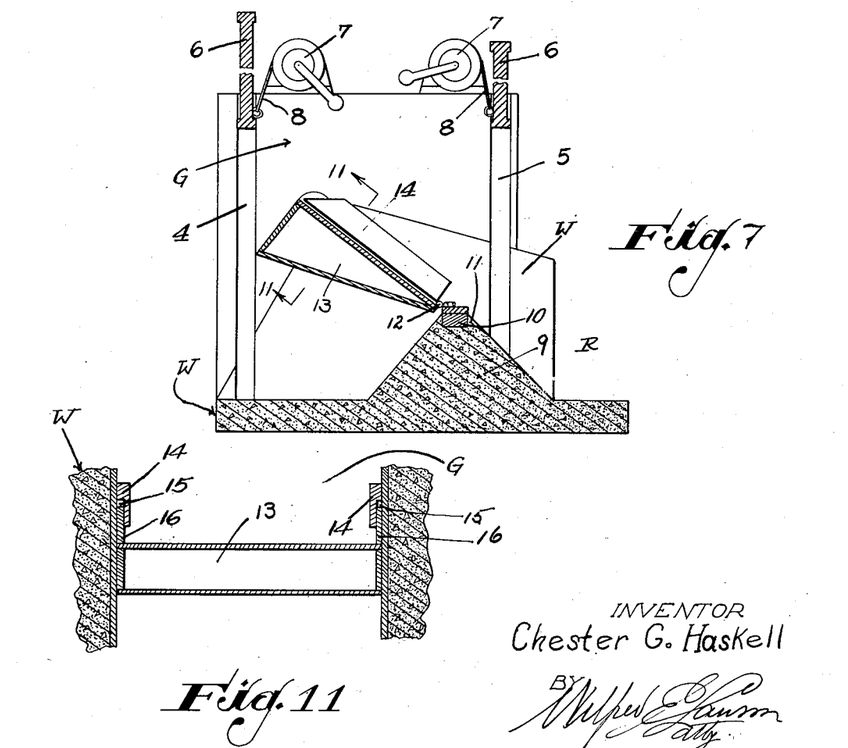
Figure 7 is a view similar to Figure 6 but showing the valve in second position.
Figure 11 is a detailed sectional view taken substantially on the line 11—11 of Figure 7.
Figure 8:
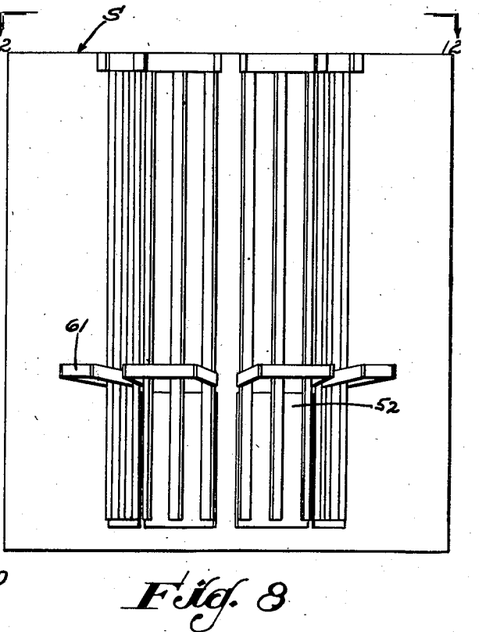
Figure 8 is a fragmentary view in elevation of a valve for controlling the outflow of the discharge reservoir.
Figure 9:
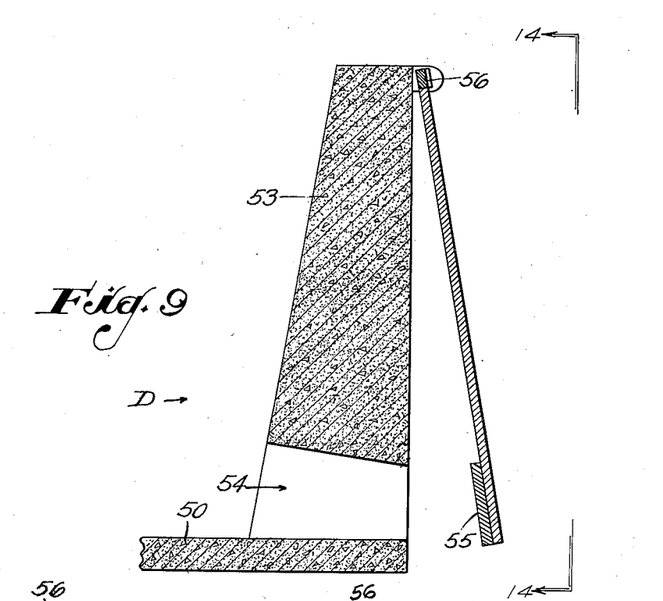
Figure 9 is an enlarged sectional view taken substantially on the line 9—9 of Figure 1.
Figure 12:
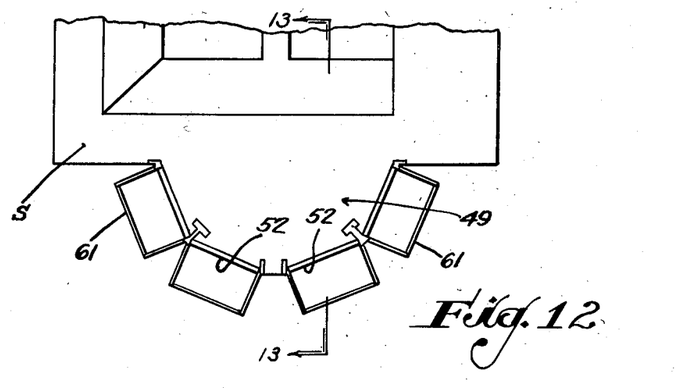
Figure 12 is a fragmentary view in top plan of the structure as illustrated in Figure 8.
Figure 13:
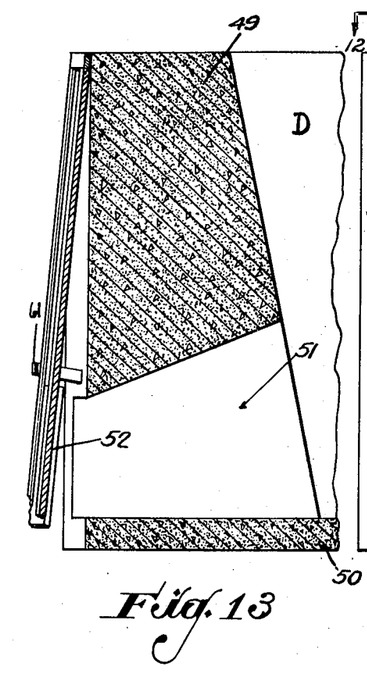
Figure 13 is a detailed sectional view taken substantially on the line 13—13 of Figure 12.
Figure 14:
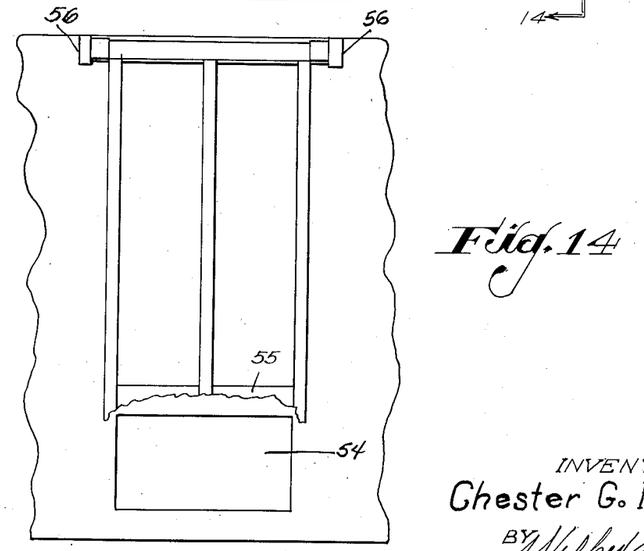
Figure 14 is a fragmentary view in front elevation of the structure illustrated in Figure 9.

Now it is believed clear that when it is desired to use the fluid entrances G, the gates 6 are raised whereupon the floats 13 will immediately rise to the level of the fluid within the reservoir R. Thus it can be seen that each float 13 becomes in effect a one way valve allowing ingress of the sea water when the force of the waves and tidal conditions are such as to be higher than the fluid level of the reservoir R, yet denying egress of the fluid into the sea when the level of the reservoir exceeds that of the sea. The stops 14 are so arranged as to allow the float to rise no higher than the desired full water level within the reservoir R.

Another seashore phenomena is to be considered. There are times when the tide is low and there are a plurality of small waves too small to induce the entry of the fluid over the wall W in the normally expected manner. However, these small waves move rapidly and possess considerable kinetic energy. This phenomena is usually produced by local atmospheric conditions.

Means of utilizing the kinetic energy of these small waves is provided for by placing suitable rectangular openings 17, in the wall W at desired intervals. The most efficient location of an opening 17 is at or near the apex of an area 2. Three of these openings 17 are shown in Figure 1 but one of said openings 17 is best shown and amplified in Figures 15, 16, 19 and 20.

Figure 15:
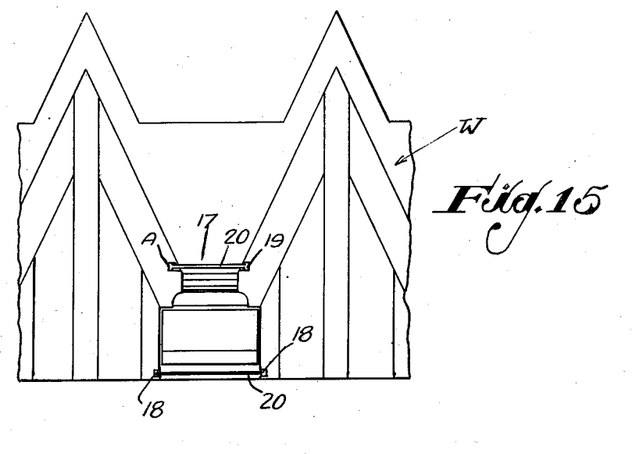
Figure 15 is a fragmentary view in top plan illustrating that feature of the invention wherein are embodied flap valves for controlling or regulating the influx of water as a result of small waves.
Figure 16:
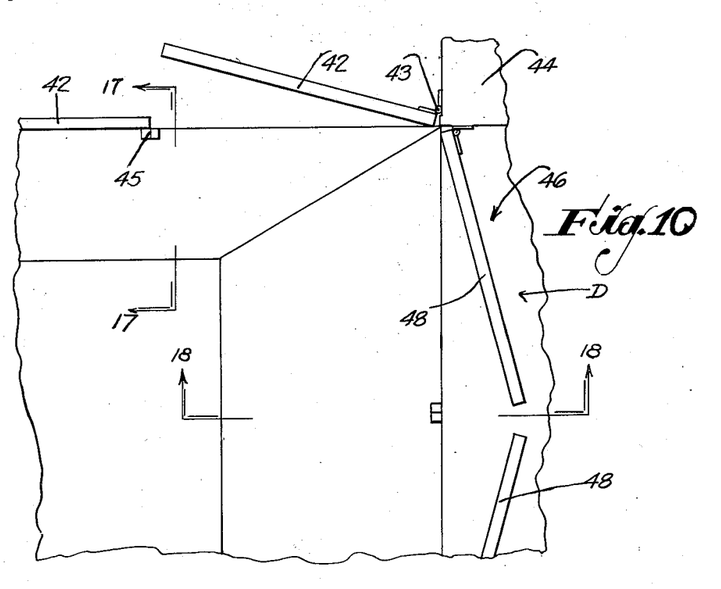
Figure 16 is a view in rear elevation of the structure as illustrated in Figure 15.

These openings 17 are of desired size but go no lower than the forwardly directed projection e of the wall W. Vertical angular guides 18 and 19 are formed opposite to each other in the boundary walls of the rectangular openings 17. One pair of the opposed vertical guides 18 is near the inner edge of the wall W and another pair of opposed guides 19 is near the outer edge of the wall W. Solid panel gates 20 slide freely vertically within said guides 18 and 19, and each gate 20, is provided with a winch and cable of conventional form (not shown) for optional and independent raising and lowering.

Figures 16, 19, 20:
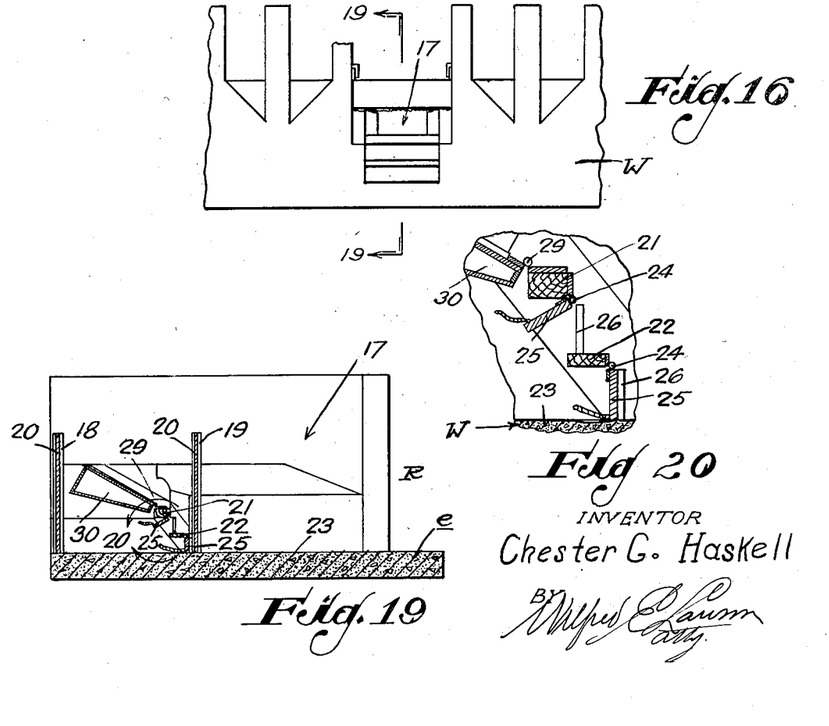
Figure 19 is a detailed sectional view taken substantially on the line 19—19 of Figure 16.
Figure 20 is an enlarged fragmentary view partly in elevation and partly in section illustrating in detail certain of the features as comprised in Figure 19.
Figure 17:
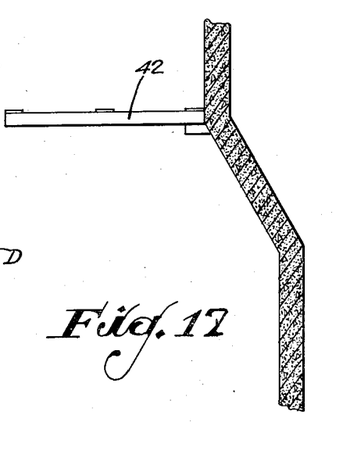
Figure 17 is a fragmentary sectional view taken on substantially the line 17—17 of Figure 10.
Figure 18:
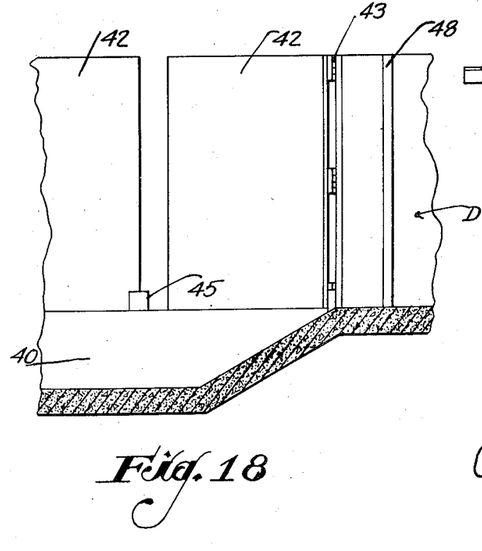
Figure 18 is a fragmentary sectional view taken substantially on the line 18—18 of Figure 10.

Extending across the forward lower portion of the opening 17 and suitably supported by the side walls thereof are the vertically spaced cross members 21 and 22, the lowermost member 22 being also suitably spaced from the bottom wall or floor 23 of the opening 17. As illustrated in Figures 19 and 20, the upper cross member 21 is inwardly offset with respect to the member 22 and as is illustrated in Figure 19, these members are inwardly of, and closely adjacent to the forward gate 20.

Hingedly connected, as at 24, to the forward marginal portion of each of the members 21 and 22 is a depending rigid flap or non-return member 25. The upper member 25 when in its lowermost or closed position substantially bridges the space between the members 21 and 22 while the lower member 25 when in its fully closed position bridges the space between the lower member 22 and the bottom or floor 23 of the opening 17.

The members 25 swing downwardly and forwardly into closed position and which closed position is positively determined by contact of the members 25 with the suitably positioned stops 26 carried by the sidewalls and floor of the opening 17.

Hingedly connected, as at 29, to the upper rear marginal portion of the top member 21 is a floating or buoyant valve or gate 30 which operates in the same manner and for the same purpose as hereinbefore set forth with respect to the valve or gate 13.

It is believed to be readily apparent that when the rapidly moving small waves within the area 2 enter the opening 17 the kinetic energy of these waves will force back the flaps 25 and dissipate this energy in raising the level of the fluid within the reservoir R. Should any of these waves be high enough, they will enter via the float valve 30 as hereinbefore described with respect to the valve 13.

Referring now to Figure 1, walls H and K are constructed forming the sides of the reservoir R. These sidewalls H and K are of suitable thickness and extend from the wall W rearwardly a desired length. The side wall K is the same elevation as the wall W whereas the side wall H is a desired elevation higher than the wall W. This greater elevation of the side wall H is to prevent the escape of excess fluid within the reservoir R into the reservoir D, to be hereinafter more particularly referred to.

Figure 3:
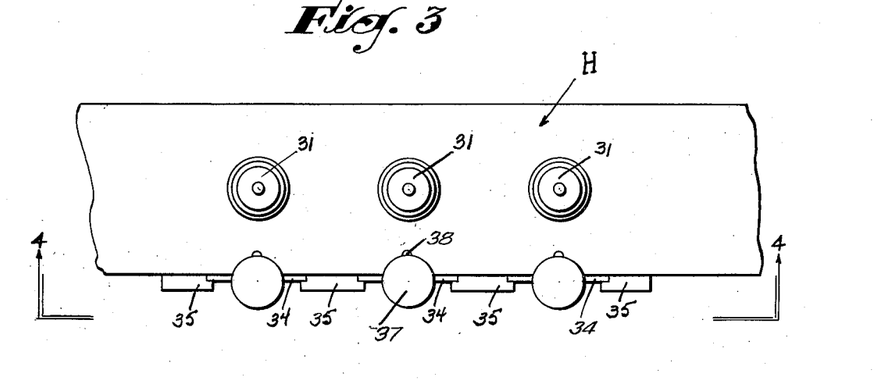
Figure 3 is an enlarged fragmentary view in top plan of the portion of the wall separating the main reservoir from the discharge reservoir and which is provided with the turbines or water wheels.
Figure 4:
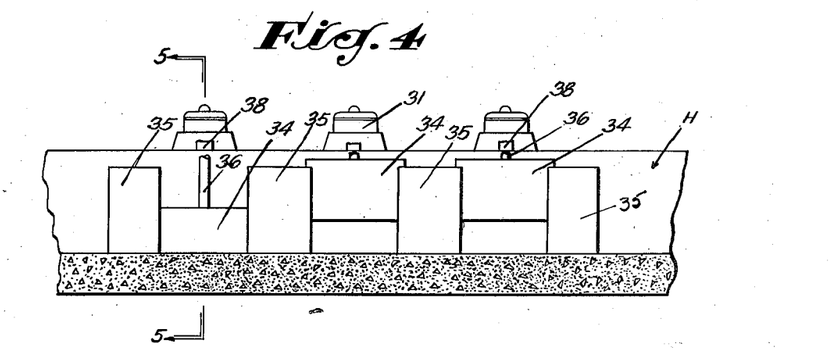
Figure 4 is a view partly in section and partly in front elevation of the structure as illustrated in Figure 3.
Figure 5:
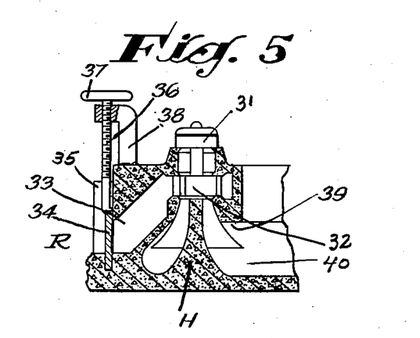
Figure 5 is a sectional view taken substantially on the line 5—5 of Figure 4.

Within the sidewall H at a suitable place therealong are located turbo-electric generators 31. (See Figures 3, 4, and 5). The generators 31 are of suitable generative capacity and are operated by the weight of falling water upon a turbine, water wheel, or other medium. Diagrammatically shown in Figure 5 is a turbine 32. The wall H is also of such height as to substantially eliminate injury to the generators 31 in times of storm.

A suitable input port 33 facing the reservoir R is provided in the side wall H before the turbine 32 of each generator 31. Each port 33 leads from the bottom of the reservoir R.

A suitable valve gate 34 is positioned before the opening 33 and, as diagrammatically shown in Figure 5, this gate 34 is vertically slidable between opposed guides 35 by means of the screw 36 and a handwheel 37. The screw 36 is operatively carried by an upstanding bracket 38 mounted on the top of the wall H. A discharge opening or outlet port 39 at a suitable level below the turbine 32 is provided to carry the spent fluid outwardly through the side wall H.

The outlet port 39 leads from the turbine 32 and discharges into a tail race 40 at a point below the bottom of the reservoir R.

This tail race 40 is closed at one end by a wall 41 herein disclosed as at right angles to the wall H, while at the opposite end of the tail race is an opening direct into the sea. The tail race 40 provides means whereby the discharge from the turbines will flow directly into the sea when the tide is at ebb or when the head of water within the reservoir R is above the level of the sea.

The outer or open end of the tail race can be closed at a point outwardly beyond the turbines 31 by the gates 42 herein disclosed as swinging in substantially a horizontal direction. The outer end marginal portion of each of the gates 42 is hingedly connected as at 43 with either wall H or the second or outer sidewall 44 of the tail race. The inward or closing movement of the gates 42 is limited by contact of the outer or free ends of the gates 42 with the properly positioned stop 45 carried by and extending upwardly from the outer or forward end portion of the tail race 40.

The wall 44 of the tail race 40 is of a length to terminate outwardly of the turbines 31 whereby is provided a relatively long opening 46 affording communication between the tail race 40 and the discharge reservoir D. The opening 46 substantially midway of its end has placed therein an upstanding column 47 to facilitate the mounting of the swinging doors 48 for closing the opening 46 when it is only desired to use the tail race 40. It is believed to be obvious that when only the tail race 40 is used, the gates 42 are in open position with the gates 48 closed. When the condition of the tide is such that the head of water within the reservoir R cannot be maintained in relation to the level of the sea, the water discharge from the turbines is permitted to enter the discharge reservoir D upon the opening of the gates 48 after the gates 42 have been closed. The closing of the gates 42 under these conditions prevents the water from the sea backing up into the tail race 40 and into the reservoir D.

The reservoir D is of predetermined area to receive the discharge of the turbines for a protracted period of time sufficient to allow for the rising of the tide or other expected unusual tidal conditions. The bottom of the reservoir D is preferably ten feet below the mean sea level, but at all times lower than the bottom of the reservoir R.

The front or sea facing wall S of the reservoir D is entirely to one side of the wall 44 of the tail race 40 and at predetermined spaced points therealong this wall S is provided with the outwardly disposed protuberances 49 of desired number and each hereindisclosed as substantially semi-circular in form.

The bottom portion of each of these protuberances 49, immediately adjacent to the bottom or floor 50 of the reservoir D, is provided therearound with the outlet openings 51 through which the water collected within the reservoir D is adapted to pass out for return to the sea. The other end of each of the openings 51 has associated therewith a flap non-return valve 52 which operates automatically to prevent return flow through the opening 51 when the tide rises.

The arrangement of the openings 51 of each of the protuberances 49 is such that they face the sea in differing angular relations with the flap valves 52 in similar arrangement, this eliminates the liability of all of the valves 52 being closed by the action of the tidewater or waves, or, in other words, assures that at least one of the flap valves 52 will be free to open under the influence of the water within the reservoir D during that period when the sea is at the level when the discharge through the openings 52 is normally expected. The wall S of the reservoir D is materially inward or shoreward from the wall W and extending outwardly from the outer or sea end of the wall H is a breakwater or sea wall B. This breakwater or wall B is of a length to extend substantially the extremity of the wall S of the reservoir D but is disposed on a predetermined outward angle with respect to both the walls S and the wall H. This breakwater or sea wall B is provided to assure a relatively untroubled or calm sea in the area around the discharge openings 51 of the reservoir D.

The outer side wall 53 of the reservoir D extends inland as determined by the requirements of practice and the forward portion of this wall 53 from the sea end thereof is provided therethrough with the spaced discharge ports 54 immediately adjacent to the bottom 50 of the reservoir D. Associated with the outer ends of each of these ports 54 is a non-return flap valve 55 operatively engaged as at 56 for required swinging movement relatively to the wall 53 closely adjacent to the top thereof. These openings 54 provide further means for the emptying of the reservoir D independently of the discharge out through the openings 51.

In the present embodiment of the invention, the sea facing wall S of the reservoir D between adjacent protuberances 49 is formed to provide a recession 57 of desired length and width and the walls 58 of the recession in the lower portions thereof and immediately adjacent to the bottom 50 of the reservoir D are also provided with the discharge openings 59 the outer end of each of which has associated therewith a non-return valve 60 functioning in the same manner and for the same purpose as the valve 52 or 55.

Associated with each of the flap valves 52 and bridging the same is the top bracket 61 carried by the outer face of a protuberance 49 whereby the outward swinging movement of a valve 52 is of a limit to prohibit the washing up of logs and other large debris that would clog the openings 51, and such stops also prevent the valves 52 being carried upwardly beyond an effective working position.

A means for limiting the valves 55 may be used if desired but this is not considered necessary although it is desirable to employ such a means in connection with the valves 60.

The power of the waves in acting on the especially designed bulkhead to harness the waves can be compared to an hydraulic ram, whereby a large volume of moving water pushes a part of that water to a greater height and also to the bowling ball, rolling in its runway, and by its momentum, rolling up the incline to the storage rack. The casual observer has but little idea of the great force of the ocean waves. In the case of large or medium sized waves, this force is great enough easily to elevate a considerable part of the water of a wave over the wall and into the reservoir, but there are times and some localities where the waves are too small to force the water over the wall. To accomplish this the principle of deflection is here used and the water from a large part of each wave is deflected from each side to the entrance of the flap valves in the rear angles of the bulkhead. The deflected water of the waves runs continuously along the deflecting walls $a$ of Figure 2 and continues sending two columns of water flowing in a V-shaped figure into the flap valves.

In this way the striking power of the wave is increased at one point, the flap valve 25, from three or five times or more and the volume of water is increased five times or more, depending upon the length of the deflecting walls $a$. This increased force enables much smaller than average waves to push a part of their water into the reservoir. When the centers of each section of the V-shaped moving columns of water of each wave, reach the flap valves, it is joined by parts of several preceding waves and their combined power makes a constant pressure to push water into the reservoir, making a continuous entrance of a stream of water at each set of flap valves.

This continuous entrance does away with the reciprocating action of the waves, which is a great advance in harnessing the waves. The reciprocating action of the waves has rendered many wave motors useless, by wearing and breaking their parts. The results of the design of the deflecting walls is a very important part of this invention.

As the ends of each wave slide along both deflecting walls $a$, their water piles up in a series of humps, as the length of each wave is squeezed together. As these humps and the water flowing between them along $a$ reach the apex of the flap valves, they replace the water entering the reservoir and have so great a volume that the water from each wave not entering the reservoir will pile up in the apex and raise the surface of the water several feet at least and sometimes to a considerable height. This rise of the water within the apices will be constant as long as there are waves. When the natural rise of the tides occurs, it unites with the rise due to deflection, so that the surface of the water rises equal to the contribution of both. When the waves run in over this raised surface of the water, they are elevated the height of the total rise of the water and their effective height of raising the water into the reservoir and the amount of water pushed into the reservoir is increased according to that rise. This increase in water elevating power for smaller waves can be equal to that of the direct wave pushing power. In localities where the tides are high it can be several times greater.

The floor of the channels of the discharge reservoir extending out from the turbines to the escape openings in the walls, and the floor of the tail race and the channels which carry the discharged water out to sea should be at least ten feet below mean tide to give free and easy flow to the water. When the tide is low and the waves make their backward motion, they will lower the water outside the openings of the discharge reservoir and cause such water to run out. If there are enough discharge swinging gates, the water in the discharge reservoir can be lowered below mean tide and thus increase the pressure head on the turbines and produce more power. We thus have the recoil of the waves helping to empty the discharge reservoir and the forward pressure of the waves filling the storage reservoir.

The invention as herein embodied will generate large amounts of electricity continuously by using the great force of the waves, elevated by the tides of the ocean and lakes, to elevate a part of the water of each wave to a higher elevation and to use the potential energy of the water thus elevated to generate electrical power as it flows back to the sea or lake through turbines or water wheels which turn the electrical generators. When the tide is high, the ocean surface and consequently the waves are higher and can thus elevate the water to a greater height equal to the rise of the tide. The tide thus also contributes power. In some instances the rise of the tide is very great and a large part of the power developed will come from the rise of the tides. In other instances the tides are so low that most of the elevation of the water will come from the force of the waves.

Where the water is deep and the waves are high, the wall W is straight and the action of the waves will easily force the water over. Where the waves are medium, the wall W is built substantially zigzag so that the waves by deflection will concentrate and raise to a height to force the water over the apices thereof. Where the waves are small, float valves 13 are placed in the apices of the wall W. Where the waves are smallest, flap valves 25 are provided in conjunction with float valves 30 to admit the water into the reservoir.

I claim:

1. A hydraulic power plant comprising a reservoir to hold a supply of water at substantially a predetermined level and including a bulkhead disposed along a tidewater shore line, said bulkhead having a water ingress opening extending upwardly from the bottom of the reservoir, superimposed non-return inlet flap valves successively operating under the pressure of the water within the reservoir and as the water level rises within the reservoir to close the lower portion of said entrance opening, and a buoyant vertically swinging check valve within the ingress opening above the flap valves for closing the opening above the flap valves by buoyant action of the water rising in the reservoir above the flap valves.

2. A hydraulic power plant as set forth in claim 1, wherein the bulkhead is positioned along the shore line at substantially the location where the ordinary large waves reach the shelving water bottom at low tide.

3. A hydraulic power plant including a reservoir to hold a supply of water at substantially a predetermined level and comprising a bulkhead disposed along a tidewater shore line, said bulkhead having a plurality of shorewardly tapering coves into which the incoming water moves, certain of said coves having water ingress opening extending upwardly from the bottom of the reservoir, a second wall for the reservoir extending inwardly from the bulkhead and having a discharge opening therethrough, a turbine carried by the second wall and having a rotor within the discharge opening for operation by the water passing through the discharge opening, a discharge reservoir into which the discharge opening delivers from the first reservoir, said discharge reservoir being of a capacity to maintain under general normal conditions a water level below that of the mean tide, the discharge reservoir having a wall facing the waterfront and provided with a discharge opening therethrough delivering into the sea, and a breakwater pier extending from the bulkhead in such direction and of such length as to be disposed beyond and to intersect the line of water flow through the discharge opening to provide a calm water area in front of said discharge reservoir wall.

4. A hydraulic power plant including a reservoir to hold a supply of water at substantially a predetermined level and comprising a bulkhead disposed along a tidewater shore line, said bulkhead having a plurality of shorewardly tapering coves into which the incoming water moves, certain of said coves having water ingress openings extending upwardly from the bottom of the reservoir, a second wall for the reservoir extending inwardly from the bulkhead and having a discharge opening therethrough, a turbine carried by the second wall and having a rotor within the discharge opening for operation by the water passing through the discharge opening, a discharge reservoir into which the discharge opening delivers from the first reservoir, said discharge reservoir being of a capacity to maintain under general normal conditions a water level below that of the mean tide, a tail race into which the discharge openings of the second wall discharges, said tail race having an end opening directly into the sea, and having a side wall provided with a relatively large discharge opening, means for closing and opening at will, the end of the tail race opening into the sea, and means for closing and opening at will the opening in the side wall of the race.

5. A hydraulic power plant including a reservoir to hold a supply of water at substantially a predetermined level and comprising a bulkhead disposed along a tidewater shore line, said bulkhead having a plurality of shorewardly tapering coves into which the incoming water moves, certain of said coves having water ingress openings extending upwardly from the bottom of the reservoir, a second wall for the reservoir extending inwardly from the bulkhead and having a discharge opening therethrough, a turbine carried by the second wall and having a rotor within the discharge opening for operation by the water passing through the discharge opening, a discharge reservoir into which the discharge opening delivers from the first reservoir, said discharge reservoir being of a capacity to maintain under general normal conditions a water level below that of the mean tide, a tail race into which the discharge opening of the second wall discharges, said tail race having an end opening directly into the sea, and having a side wall provided with a relatively large discharge opening, means for closing and opening at will the end of the tail race opening into the sea, means for closing and opening at will the opening in the side wall of the race, and a discharge reservoir into which delivers the opening in the side wall of the tail race, said discharge reservoir being of a capacity to maintain under general normal conditions a water level below that of the level within the first reservoir.

6. A hydraulic power plant including a reservoir to hold a supply of water at substantially a predetermined level and compriisng a bulkhead disposed along a tidewater shore line, said bulkhead having a plurality of shorewardly tapering coves into which the incoming water moves, certain of said coves having water ingress openings extending upwardly from the bottom of the reservoir, a second wall for the reservoir extending inwardly from the bulkhead and having a discharge opening therethrough, a turbine carried by the second wall and having a rotor within the discharge opening for operation by the water passing through the discharge opening, a discharge reservoir into which the discharge opening delivers from the first reservoir, said discharge reservoir being of a capacity to maintain under general normal conditions a water level below that of the mean tide, a tail race into which the discharge opening of the second wall discharges, said tail race having an end opening directly into the sea, and having a side wall provided with a relatively large discharge opening, means for closing and opening at will the end of the tail race opening into the sea, means for closing and opening at will the opening in the side wall of the race, a discharge reservoir into which delivers the opening in the side wall of the tail race, said discharge reservoir being of a capacity to maintain under general normal conditions a water level below that of the level within the first reservoir, and the outlet end of the tail race opening into the sea being below the bottom of the discharge reservoir.

7. A wave and tide power plant comprising a reservoir for holding a supply of water at substantially a predetermined level, the reservoir having a wall disposed along a tide water shore line and continuing seawardly at its two ends in divergent breakwaters, said wall between the breakwaters being of zig-zag contour providing a plurality of seaward facing coves into which waves are gathered for passage over the wall into the reservoir, a low wall disposed across one of the coves and having a top cross member, a float valve pivoted to said top member for vertical swinging on the reservoir side of the low wall between the two sides of the cove to be elevated by water in the reservoir, means limiting the upward swing of the valve, a discharge reservoir at one side of the first reservoir, an outlet port leading from the first reservoir to the discharge reservoir, power generating means in said port for operation by water passing therethrough, the discharge reservoir having a seaward facing wall behind and spaced from an adjacent breakwater, an outlet in the last wall, and said breakwater having a length substantially equal to that of the last mentioned wall whereby to provide a calm water area in front of the last wall.

8. A wave and tide power plant of the character stated in claim 7, with an outwardly extending horizontal floor in the bottom of another one of said coves at an elevation substantially lower than said low wall, a plurality of inwardly opening flap valves between the sides of the last mentioned cove, vertically movable gates within the last mentioned cove and between which said flap valves are located, and vertically movable gates between the sides of the said one of the coves and between which said float valve is positioned.

9. A hydraulic power plant including a supply reservoir having a long bulkhead forming one side wall and disposed along a tidewater shore line, a turbine operated by the water within the reservoir, a discharge reservoir into which water operating the turbine passes, the bulkhead having its ends extended divergently outwardly from the shore line to provide a confining area to concentrate the force of water rolling therein to assure passage of water over the bulkhead in substantially a continuous flow, said bulkhead wall having the lower forward face vertical and the upper portion of the forward face disposed on an upward and inward incline, said discharge reservoir having a wall facing the water front and provided with a discharge opening, and the adjacent one of the divergent extended ends of the bulkhead being disposed in shielding relation to and spaced from the last named wall and providing a calm water area into which the last named discharge opening leads.

CHESTER G. HASKELL.

REFERENCES CITED

The following references are of record in the file of this patent:

UNITED STATES PATENTS

| Number | Name | Date |
| --- | --- | --- |
| 969,967 | McDonald | Sept. 13, 1910 |
| 1,067,049 | Miller | July 8, 1913 |
| 1,255,159 | Gustafson | Feb. 5, 1918 |
| 1,695,733 | Knowlton | Dec. 18, 1928 |
| 1,868,087 | Blair | July 19, 1932 |
| 2,410,430 | Danel | Nov. 5, 1946 |
| 2,432,510 | Danel | Dec. 16, 1947 |
| 2,435,576 | Danel | Feb. 10, 1948 |
| 2,436,793 | Danel | May 2, 1948 |
| 2,441,759 | Gay | May 18, 1948 |